(12) United States Patent
Liu et al.

(10) Patent No.: US 9,223,092 B2
(45) Date of Patent: Dec. 29, 2015

(54) COMPACT MICRO-OPTICAL DEVICES AND METHODS USING ASYMMETRIC LENSES

(71) Applicants: Yunqu Liu, Kanata (CA); Kin-Wai Leong, Ottawa (CA)

(72) Inventors: Yunqu Liu, Kanata (CA); Kin-Wai Leong, Ottawa (CA)

( * ) Notice: Subject to any disclaimer, the term of this patent is extended or adjusted under 35 U.S.C. 154(b) by 0 days.

(21) Appl. No.: 13/914,739

(22) Filed: Jun. 11, 2013

(65) Prior Publication Data

US 2013/0330039 A1 Dec. 12, 2013

Related U.S. Application Data

(60) Provisional application No. 61/657,937, filed on Jun. 11, 2012, provisional application No. 61/657,943, filed on Jun. 11, 2012.

(51) Int. Cl.
| | |
|---|---|
| *G02B 6/26* | (2006.01) |
| *G02B 6/42* | (2006.01) |
| *G02B 6/32* | (2006.01) |
| *G02B 6/30* | (2006.01) |
| *G02B 6/28* | (2006.01) |
| *G02B 6/293* | (2006.01) |

(52) U.S. Cl.
CPC .. *G02B 6/32* (2013.01); *G02B 6/28* (2013.01); *G02B 6/30* (2013.01); *G02B 6/29379* (2013.01)

(58) Field of Classification Search
CPC .............. G02B 6/28; G02B 6/30; G02B 6/32
USPC ......................................... 385/33, 34, 50, 51
See application file for complete search history.

(56) References Cited

U.S. PATENT DOCUMENTS

| | | | | |
|---|---|---|---|---|
| 7,113,672 | B2 * | 9/2006 | Wang | 385/34 |
| 7,218,811 | B2 * | 5/2007 | Shigenaga et al. | 385/33 |
| 2002/0076151 | A1 * | 6/2002 | Kinard et al. | 385/33 |

* cited by examiner

*Primary Examiner* — Ryan Lepisto
(74) *Attorney, Agent, or Firm* — The Law Office of Michael E. Kondoudis

(57) ABSTRACT

The performance, reliability, and cost of the optical couplers depends heavily on their design and packaging technologies. A need still exists in the art of design and manufacturing of optical coupler devices to provide superior performance, improved reliability and reduced cost simultaneously while addressing issues such as walk-off. Such improvements arising from the inclusion of asymmetric optical elements within the optical path rather than the circularly symmetric optical elements within the prior art.

9 Claims, 11 Drawing Sheets

1210

1220

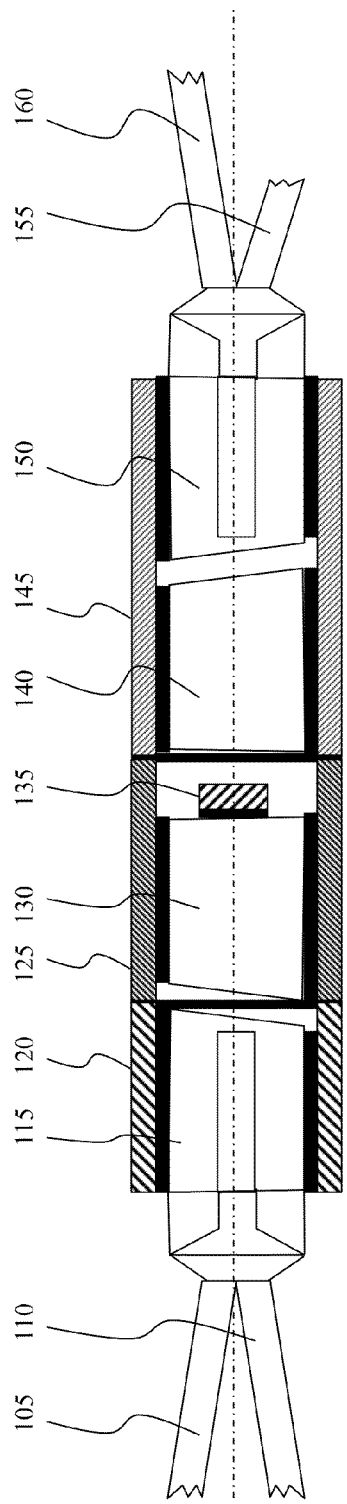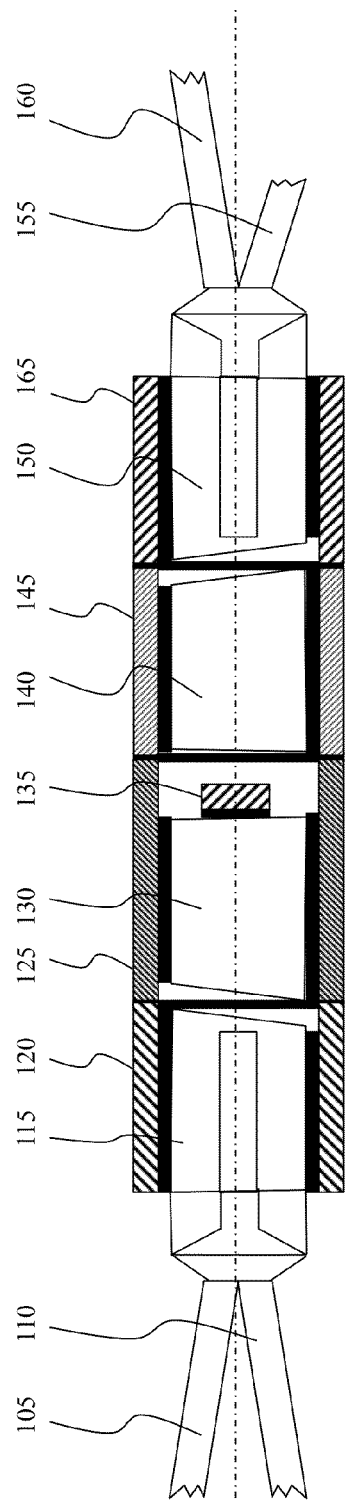
Figure 1A
Figure 1B
PRIOR ART

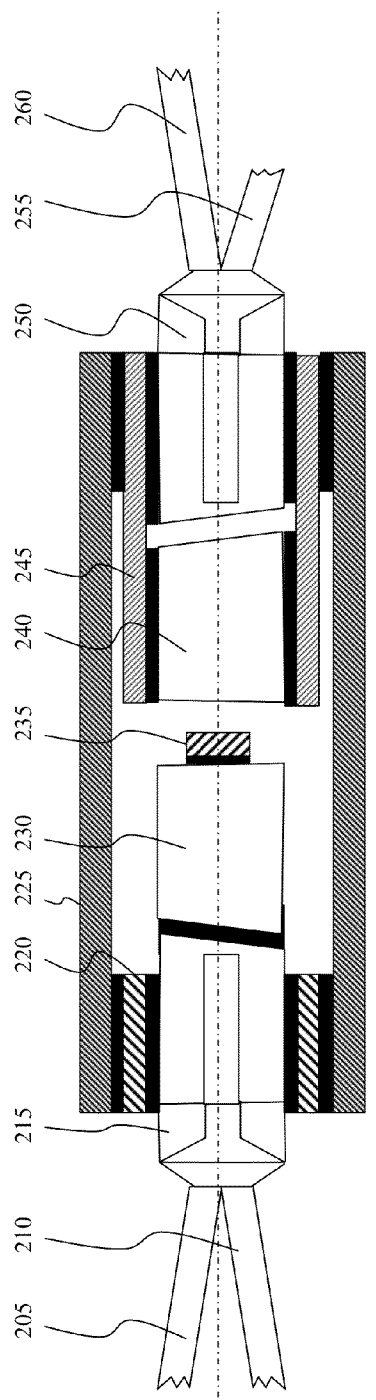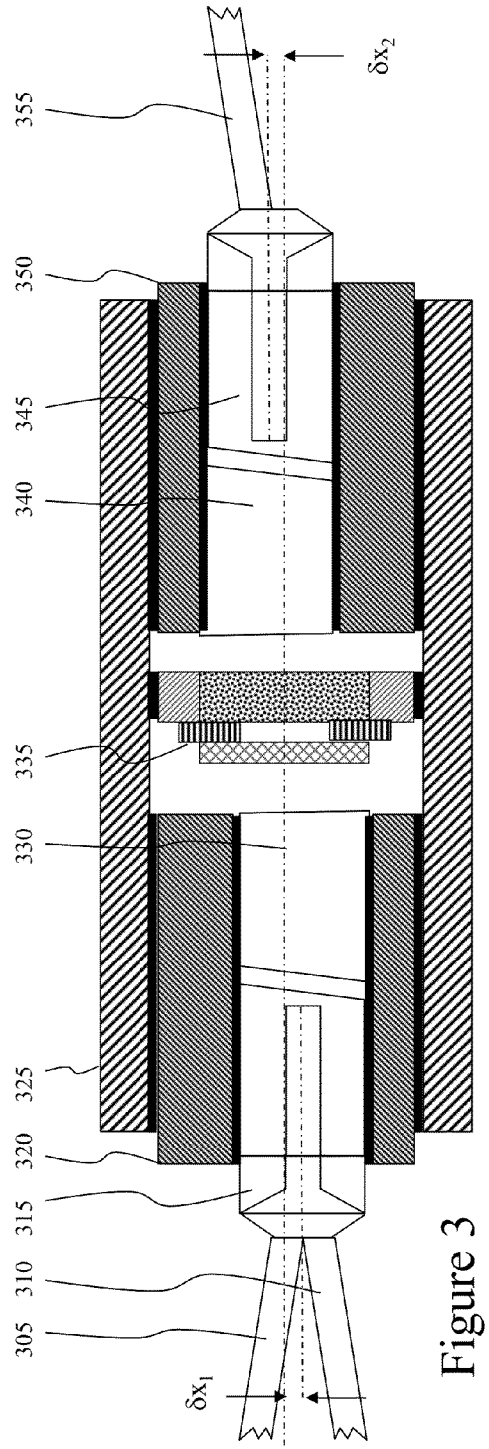

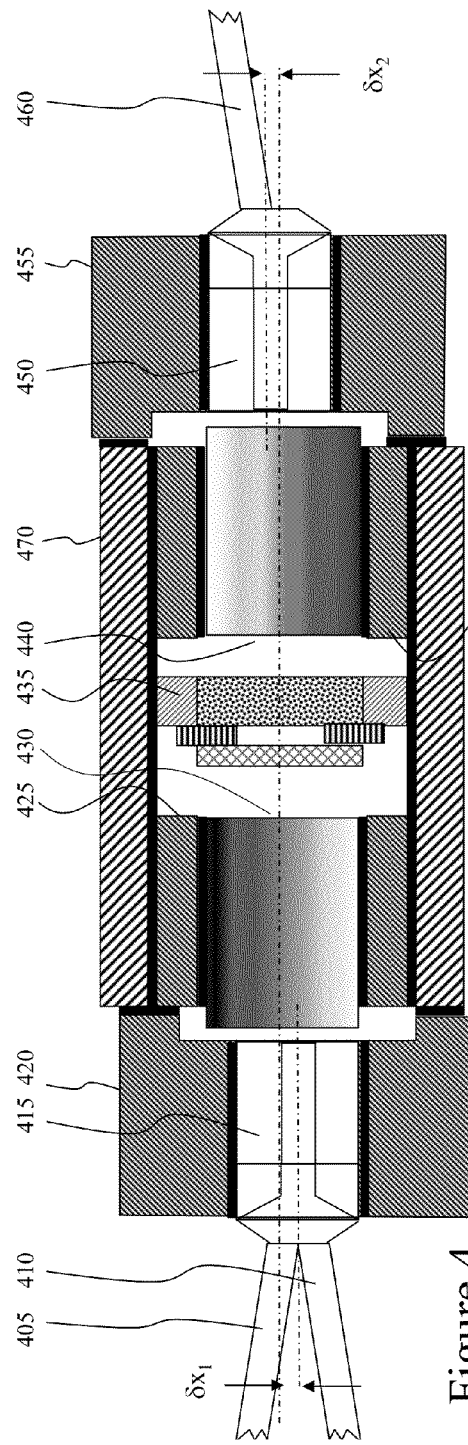
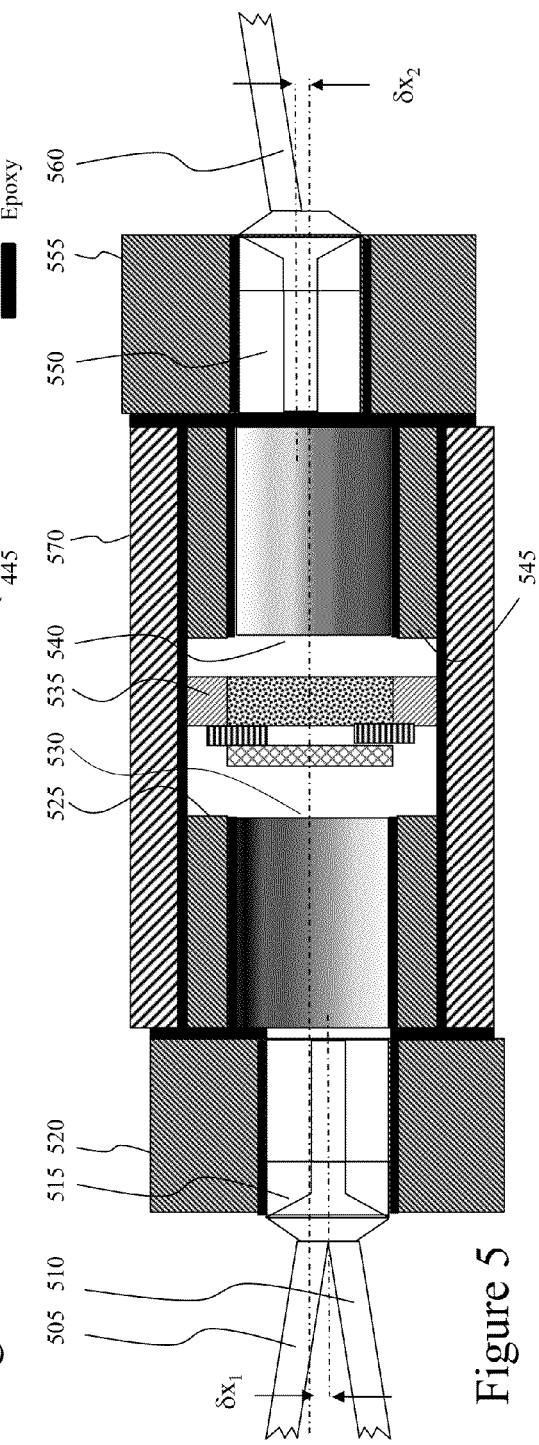
Figure 4
Figure 5

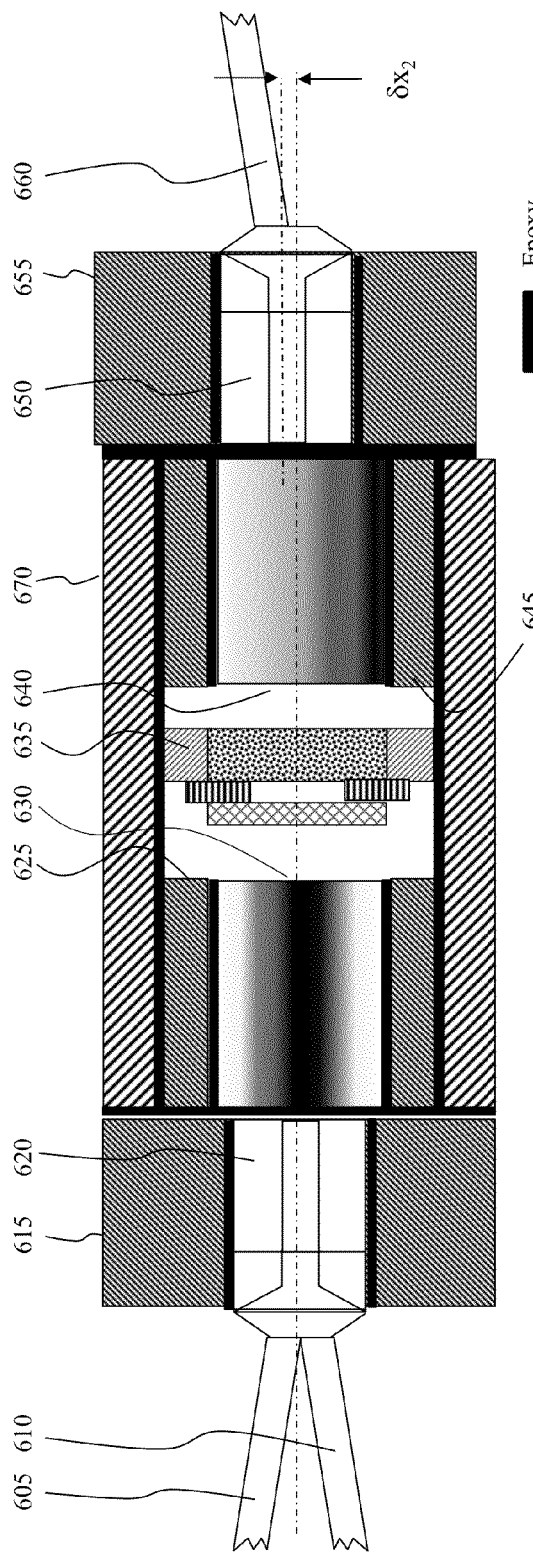
Figure 6
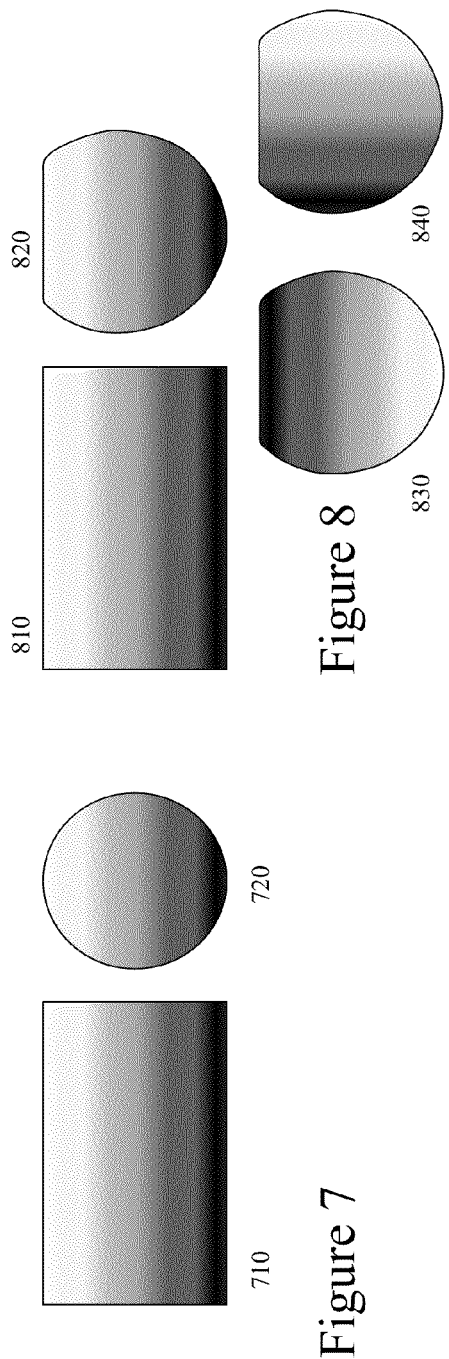
Figure 7
Figure 8

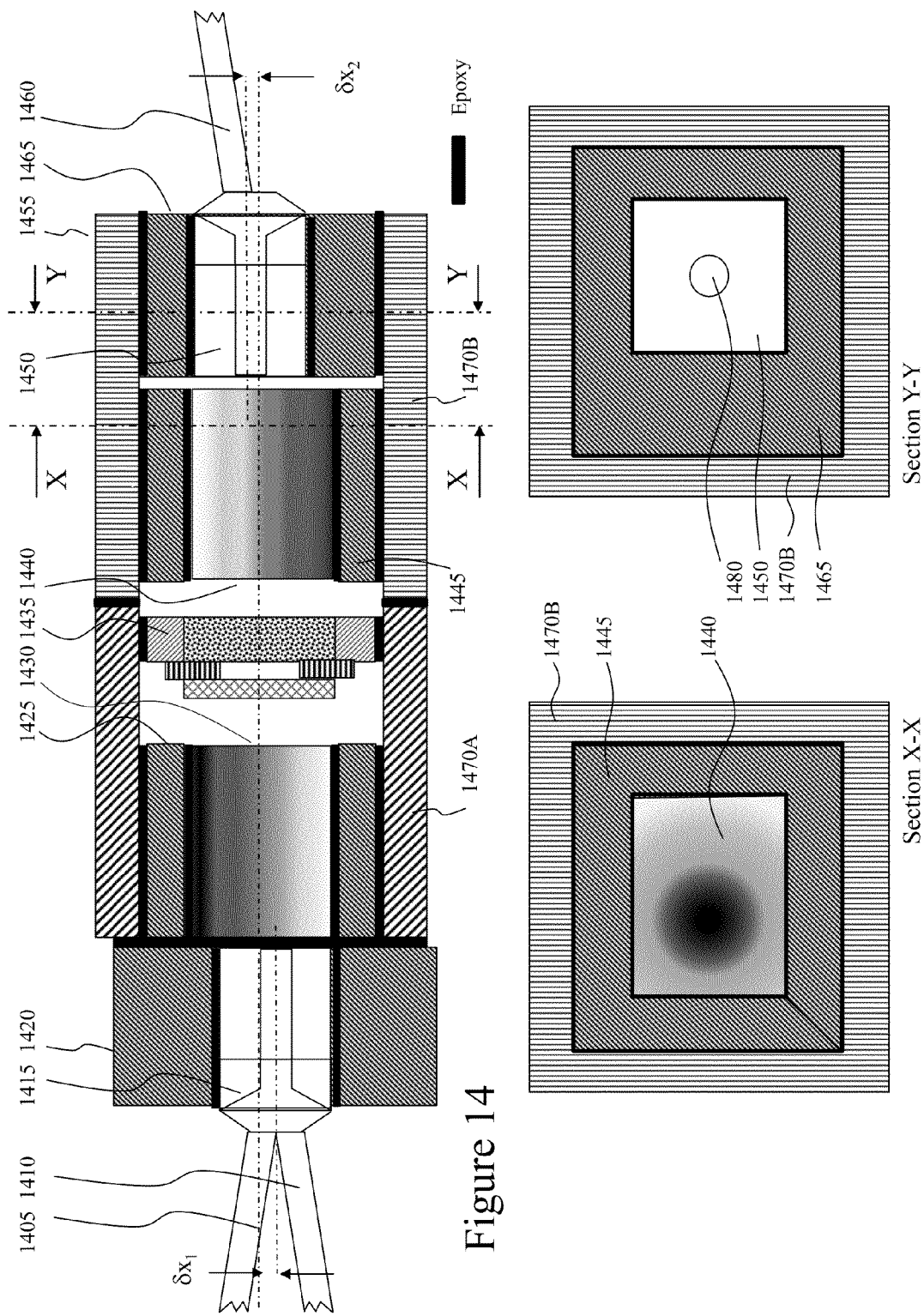

COMPACT MICRO-OPTICAL DEVICES AND METHODS USING ASYMMETRIC LENSES

CROSS-REFERENCE TO RELATED APPLICATIONS

This patent application claims the benefit of U.S. Provisional Patent Application 61/657,937 filed Jun. 11, 2012 entitled "Compact Micro-Optical Devices and Methods using Asymmetric Lenses" and U.S. Provisional Patent Application 61/657,943 filed Jun. 11, 2012 entitled "Compact Micro-Optical Devices and Methods using Asymmetric Lenses", the entire contents of both patent applications being included by reference.

FIELD OF THE INVENTION

The present invention relates to micro-optical devices and in particular fiber coupled micro-optic coupler devices employing asymmetric lenses.

BACKGROUND OF THE INVENTION

Micro-optical couplers are widely used in a variety of applications including data communications, telecommunications, and sensing. Such micro-optical couplers typically comprise one or more optical functional elements which selectively transmit, reflect, attenuate, filter, split, combine, or manipulate the optical signals propagating within them together with an input and output optical systems for guiding light to/from the functional elements from/to the optical fibers that transmit the optical signals within the systems that the micro-optical couplers form part of. Micro-optical devices also allow integration of two or more elements within the same component thereby reducing component count, cost, footprint etc. For example in optical amplifiers micro-optical devices may combine a power tap, wavelength division multiplexer (WDM), gain flattening filter (GFF), and optical isolator. Typically, the functional optical elements are thin film filters, micro-optical isolator cores, and birefringent/polarizing sheets whilst the input and output optical systems usually comprise a collimating lens, as well as input and output optical waveguides (usually optical fibers).

Typical prior art micro-optic coupler designs require that only small and even gaps exist between all the cylindrical surrounding surfaces that are bonded together. Also, from cost and mechanical design requirements the active alignment processes employed in such prior art micro-optic couplers should avoid the requirements for active angular alignment. Such a requirement requires that the design provides effective means to compensate for the inherent optical path walk-off that occurs within such micro-optical couplers, while keeping all the mechanical parts within the device structure fitting tightly to each other to minimize solder and/or epoxy (glue) lines.

The performance, reliability, and cost of the optical couplers depends heavily on their design and packaging technologies. A need still exists in the art of design and manufacturing of optical coupler devices to provide superior performance, improved reliability and reduced cost simultaneously whilst addressing issues such as walk-off. Such improvements arising from the inclusion of asymmetric optical elements within the optical path rather than the circularly symmetric optical elements within the prior art.

Beneficially embodiments of the invention provide a multi-port optical coupler design platform that can be used for a range of micro-optic couplers including, but not limited to, wavelength division multiplexers (WDM), tap coupler, gain flattening filter, isolator and compact hybrid devices with multiple functions. The design methodology is compatible with epoxy-free optical path, hermetic assemblies, and epoxy-in-path designs according to the requirements for environmental performance, reliability, cost, etc.

It is a further object of this invention to provide a micro-optic coupler design that requires fewer parts, allows the functional optical elements to be pre-assembled and the optical fibers assembled thereafter such that automated optical pre-screening of the functional optical assemblies can be performed prior to the assembly of the optical fibers which is typically a labour intensive element impacting the overall cost of the micro-optic couplers.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to advance the state of the art with respect to micro-optical devices and in particular fiber coupled micro-optic coupler devices employing asymmetric lenses.

In accordance with an embodiment of the invention there is provided a method comprising:

providing a housing;

providing a functional core having a predetermined optical function and an axis with respect to the direction of optical signals coupled to the functional core;

providing a first graded refractive index lens with a first predetermined refractive index profile wherein a physical axis of the first graded refractive index lens is aligned to the axis of the functional core;

providing a second graded refractive index lens with a second predetermined asymmetric refractive index profile wherein a physical axis of the second graded refractive index lens is aligned to the axis of the functional core; wherein the first and second graded refractive index lenses are orientated to establish a predetermined relationship between the first and second predetermined asymmetric refractive index profiles.

In accordance with an embodiment of the invention there is provided a device comprising:

a housing;

a functional core having a predetermined optical function and an axis with respect to the direction of optical signals coupled to the functional core;

a first graded refractive index lens with a first predetermined refractive index profile wherein a physical axis of the first graded refractive index lens is aligned to the axis of the functional core;

a second graded refractive index lens with a second predetermined asymmetric refractive index profile wherein a physical axis of the second graded refractive index lens is aligned to the axis of the functional core; wherein the first and second graded refractive index lenses are orientated to establish a predetermined relationship between the first and second predetermined asymmetric refractive index profiles.

In accordance with another embodiment of the invention there is provided a method comprising:

providing a housing;

providing a functional core having a predetermined optical function and an axis with respect to the direction of optical signals coupled to the functional core;

providing a first graded refractive index lens with a first predetermined refractive index profile and a first non-circular outer profile, wherein a physical axis of the first graded refractive index lens has a first predetermined alignment to the axis of the functional core; and providing a second graded refractive index lens with a second predetermined refractive index profile and a second non-circular outer profile, wherein a physical axis of the second graded refractive index lens has a second predetermined alignment to the axis of the functional core.

In accordance with another embodiment of the invention there is provided a device comprising:

a housing;

a functional core having a predetermined optical function and an axis with respect to the direction of optical signals coupled to the functional core;

a first graded refractive index lens with a first predetermined refractive index profile and a first non-circular outer profile, wherein a physical axis of the first graded refractive index lens has a first predetermined alignment to the axis of the functional core; and a second graded refractive index lens with a second predetermined refractive index profile and a second non-circular outer profile, wherein a physical axis of the second graded refractive index lens has a second predetermined alignment to the axis of the functional core.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 1A and 1B depict micro-optic couplers according to the prior art;

FIG. 2 depicts a micro-optic coupler according to the prior art;

FIG. 3 depicts a micro-optic coupler employing an asymmetric mechanical element according to an embodiment of the invention;

FIG. 4 depicts a micro-optic coupler employing asymmetric lenses according to an embodiment of the invention;

FIG. 5 depicts a micro-optic coupler employing asymmetric lenses according to an embodiment of the invention;

FIG. 6 depicts a micro-optic coupler employing an asymmetric lens according to an embodiment of the invention;

FIG. 7 depicts an asymmetric lens according to an embodiment of the invention;

FIG. 8 depicts an asymmetric lens according to an embodiment of the invention;

FIG. 14 depicts a micro-optic coupler employing symmetric and asymmetric lenses with symmetric and asymmetric mechanical assemblies with multiple sections according to an embodiment of the invention.

DETAILED DESCRIPTION

Figure 9A:
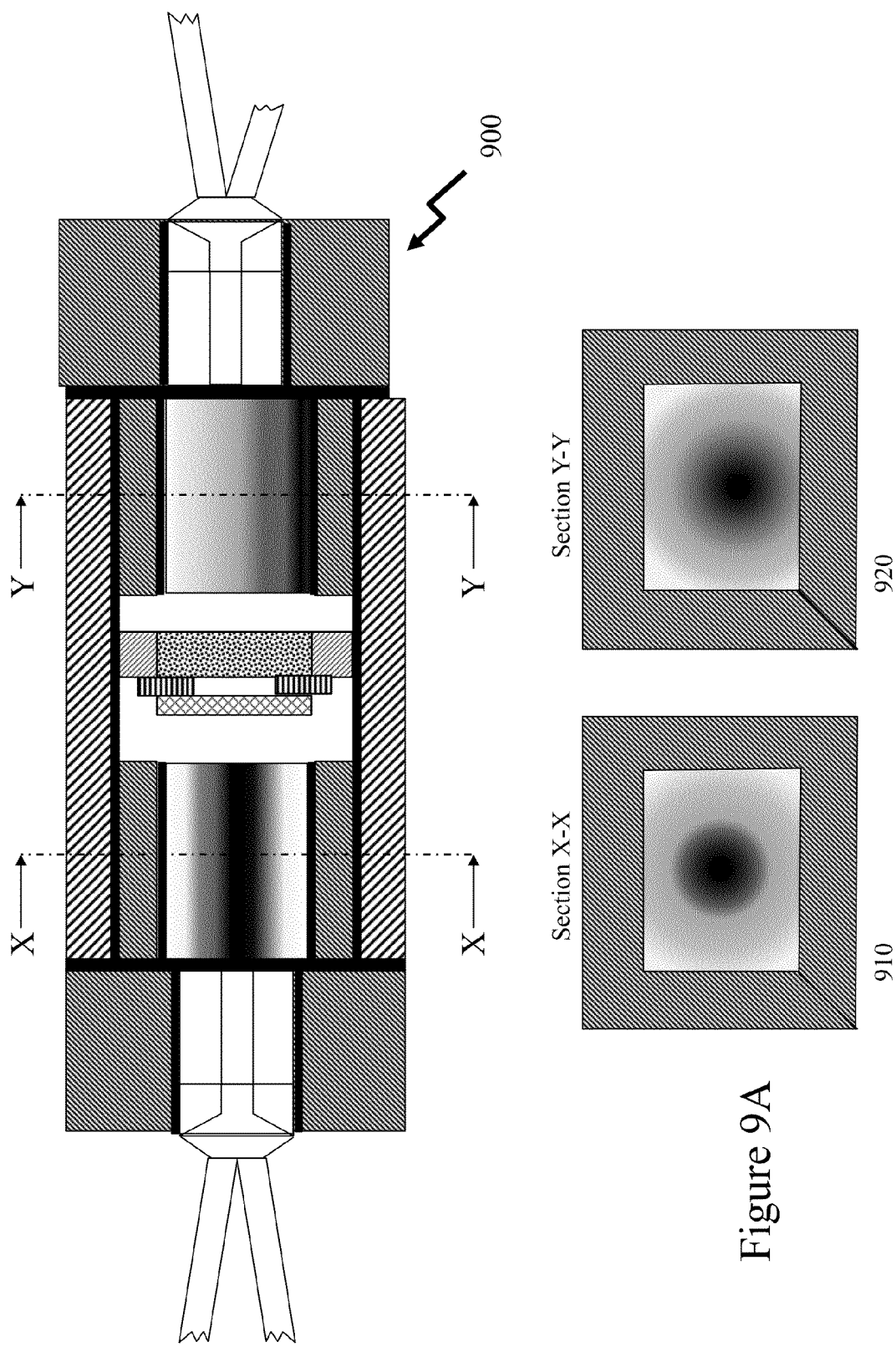
FIG. 9A depicts a micro-optic coupler employing an asymmetric lens according to an embodiment of the invention.

The present invention is directed to optical devices and in particular, fiber optic coupler devices for use in optical fiber technology and to a method for making the same.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Optical walk-off within micro-optic couplers usually occurs when the optical beam travels through the gap between the inner surfaces of the first and second collimating lenses, the first collimating lens coupling an input optical fiber to the micro-optic device, and the second collimating lens coupling an output optical fiber to the micro-optic device. In reflective micro-optic devices the first and second collimating lenses will typically be the same collimating lens. Accordingly, the optical walk-off occurs if the beam has an angle with respect to the optical axis of the micro-optic coupler to which the first and second collimating lenses are typically aligned. Hence, one source for beam walk-off in an optical coupler device is the angle of the beam emerging from the inner surfaces of the lenses. For example, the transmission beam of a reflective tap coupler or a WDM coupler will usually have an angle with respect to the optical axis. Another source is the collimated light beam deviation after passing through any wedges or non-uniform optical elements. In an optical coupler, it is a common practice to polish the inner end surface of the collimating lens to a small angle to minimize the so-called ripple effect, which will usually result in a wedge, and hence beam walk-off.

It has been also been well documented that beam walk-off, and in many instances significant beam walk-off, occurs when a light beam with limited beam size passes through a multi-layer medium, such as a DWDM thin film filters for example, with a non-zero incident angle. Such issues are further complicated by the fact that beam walk-off occurs when a light beam passes through a birefringent material, such as an isolator core, even if the incident angle is zero.

Referring to FIG. 1A there is depicted a micro-optic coupler according to the prior art. As depicted there is an input fiber 105 and a first output fiber 110 which are coupled to a first dual fiber pigtail assembly 115 which is assembled within first housing 120. This assembly is coupled to first graded refractive index (GRIN) lens 130 which is assembled within second housing 125 and has upon its other surface a thin-film filter 135. Coupled to the second housing 125 is third housing 145 within which second GRIN lens 140 is assembled together with second dual fiber assembly 150 that houses output fiber 160 and terminated fiber 155. Accordingly three optical sub-assemblies are assembled to provide the micro-optic coupler. As depicted all such interfaces as well as those relating to assembly of each sub-assembly are assembled using an epoxy, such as for example Epotex 353ND for example.

Now referring to FIG. 1B there is depicted a micro-optic coupler according to the prior art of Zheng in U.S. Pat. No. 6,347,170. Accordingly, there is an input fiber 105 and a first output fiber 110 which are coupled to a first dual fiber pigtail assembly 115 which is assembled within first housing 120. This assembly is coupled to first graded refractive index (GRIN) lens 130 which is assembled within second housing 125 and has upon its other surface a thin-film filter 135. Coupled to the second housing 125 is third housing 145 within which second GRIN lens 140 is assembled. A second dual fiber assembly 150 that houses output fiber 160 and terminated fiber 155 is housed within a fourth housing 165. Accordingly four optical sub-assemblies are assembled to provide the micro-optic coupler.

As evident from the abstract of Zheng the assembly process is convoluted and prone to yield issues. The inventors quote "a WDM filter attached to a first GRIN lens by applying a first heat-curing epoxy. The WDM coupler further includes the first GRIN lens inserted and fixed into a first holding tube by applying a second heat-curing epoxy. The WDM coupler further includes a second holding tube holding a dual fiber pigtail. The dual fiber pigtail is disposed at a first optimal position from the first GRIN lens to achieve a lowest reflection loss with the first and second holding tubes being in contact with each other. The dual fiber pigtail and the first and second holding tubes are fixed together by applying a third heat-curing epoxy. The WDM coupler further includes a second GRIN lens inserted and fixed into a third holding tube by applying a fourth heat-curing epoxy. The WDM coupler further includes a fourth holding tube holding a standard single fiber pigtail. To achieve a lowest transmission loss, the single fiber pigtail is disposed at a second optimal position from the second GRIN lens while the first GRIN lens is disposed at a third optimal position from the second GRIN lens. With the first, third and fourth holding tubes being in contact with each other, a fifth heat-curing epoxy is applied to fix the third and fourth holding tubes together and a sixth heat-curing epoxy is applied to fix the first and third holding tubes together."

Referring to FIG. 2 there is depicted a micro-optic coupler according to the prior art of Wang et al in U.S. Pat. No. 7,440,652. As depicted there is an input fiber 205 and a first output fiber 210 which are coupled to a first dual fiber pigtail assembly 215 which is assembled within first housing 220. This assembly is coupled to first graded refractive index (GRIN) lens 230. The first housing is assembled within second housing 225 and upon the exposed surface of first GRIN lens 230 there is provided a thin-film filter 235. Also coupled to the second housing 225 is third housing 245 within which second GRIN lens 240 is assembled as well as second dual fiber assembly 250 that houses output fiber 260 and terminated fiber 255. Accordingly Wang teaches to fewer optical sub-assemblies and alignments but the extended unsupported elements result in reduced environmental performance, e.g. vibration, shock, etc.

Referring to FIG. 3 there is depicted a micro-optic coupler according to an embodiment of the invention. Accordingly, there is an input fiber 305 and a first output fiber 310 which are coupled to a first dual fiber pigtail assembly 315 which is assembled within first asymmetric housing 320. This assembly is coupled to first graded refractive index (GRIN) lens 330 which is therefore housed within first asymmetric housing 320 and assembled within second housing 325. Also disposed within the second housing 325 is functional core 335 and second asymmetric housing 350 within which second GRIN lens 340 is assembled together with second dual fiber assembly 345 that houses output fiber 355. Accordingly, the micro-optic coupler rather than seeking to limit/minimize walk off specifically establishes offset interfaces to/from the functional core 325 and provides through angular rotation of the first and second asymmetrical housings 320 and 350 respectively within the second housing 325 the manufacturing corrections.

Now referring to FIG. 4 there is depicted a micro-optic coupler according to an embodiment of the invention. Accordingly, there is an input fiber 405 and a first output fiber 410 which are coupled to a first fiber pigtail assembly 415 which is assembled within first housing 420. This assembly is coupled to first graded refractive index (GRIN) lens 430 which is therefore housed within second housing 425, which is itself assembled within outer housing 470. Also disposed within the outer housing 470 is functional core 435 and third housing 445 within which is second GRIN lens 440. Coupled to the third housing 445 is fourth housing 455 which has assembled within it the second fiber pigtail assembly 450 that houses output fiber 460. Accordingly, the micro-optic coupler rather than seeking to limit/minimize walk off specifically establishes offset interfaces to/from the functional core 435 and provides through angular rotation and lateral movement of the first and fourth housings 420 and 455 respectively correction/adjustment during manufacturing corrections for the walk-off.

In contrast to the prior art first and second GRIN lenses 430 and 440 respectively are asymmetric lenses wherein their optical axis of symmetry does not lie along the physical axis of the micro-optic coupler even though the physical axis of the first and second GRIN lenses 430 and 440 respectively are aligned to the physical axis of the micro-optic coupler. As depicted each of the first and second GRIN lenses 430 and 440 respectively project slightly from the outer housing 470 whilst each of the first and second fiber pigtail assemblies 415 and 450 respectively are assembled within first and fourth housings 420 and 455 which have lipped edges. It would be evident to one skilled in the art that the lip may be dimensions relative to the projection of the GRIN lens such that allowance for the epoxy line attaching each housing to the assembly is made and that the air gap between the lenses and optical fibers minimized or alternatively also filled with an epoxy which may be the same as that used for the assembly of each pigtail assembly or different. It would be further evident that the first and second GRIN lenses 430 and 440 may be assembled into the outer housing 470 with their respective housings and the functional core 435 and tested as a separate manufacturing process to that of assembling the final micro-optic coupler. Accordingly, this sub-assembly may be assembled in a manner that is hermetic or non-hermetic.

Within FIG. 4 and other Figures within the specification refractive index variations have been depicted as simple linear or approximately grey tone variations. It would be understood by one skilled in the art that such depictions are for representational purposes only as the refractive index variations within the optical elements, e.g. GRIN lenses, may be linearly varying, varying with predetermined non-linearity, contain abrupt transitions, sinusoidally varying, linear with sinusoidal overlay, etc. Such refractive index profiles may be achieved for example by forming the desired physical profile and then creating the desired index profile through one or more technique including, but not limited to, diffusion, ion exchange, ion implantation, and deposition.

Referring to FIG. 5 there is depicted a micro-optic coupler according to an embodiment of the invention. Accordingly, there is an input fiber 505 and a first output fiber 510 which are coupled to a first fiber pigtail assembly 515 which is assembled within first housing 520. This assembly is coupled to first graded refractive index (GRIN) lens 530 which is therefore housed within second housing 525, which is itself assembled within outer housing 570. Also disposed within the outer housing 570 is functional core 535 and third housing 545 within which is second GRIN lens 540. Coupled to the third housing 545 is fourth housing 555 which has assembled within it the second fiber pigtail assembly 550 that houses output fiber 560. Accordingly, the micro-optic coupler rather than seeking to limit/minimize walk off specifically establishes offset interfaces to/from the functional core 535 and provides through angular rotation and lateral movement of the first and fourth housings 520 and 555 respectively correction/adjustment during manufacturing corrections for the walk-off.

In contrast to the prior art first and second GRIN lenses 530 and 540 respectively are asymmetric lenses wherein their optical axis of symmetry does not lie along the physical axis of the micro-optic coupler even though the physical axis of the first and second GRIN lenses 530 and 540 respectively are aligned to the physical axis of the micro-optic coupler. As depicted each of the first and second GRIN lenses 530 and 540 respectively are flush with the ends of the outer housing 570 whilst each of the first and second fiber pigtail assemblies 515 and 550 respectively are assembled within first and fourth housings 520 and 555 which are flush. It would be evident that the epoxy line may alternatively be defined as an annulus between the piece-parts such that the overall assembly is epoxy free in the optical path. It would be further evident that the first and second GRIN lenses 530 and 540 may be assembled into the outer housing 570 with their respective housings and the functional core 535 and tested as a separate manufacturing process to that of assembling the final micro-optic coupler. Accordingly, this sub-assembly may be assembled in a manner that is hermetic or non-hermetic.

Referring to FIG. 6 there is depicted a micro-optic coupler according to an embodiment of the invention. Accordingly, there is an input fiber 605 and a first output fiber 610 which are coupled to a first fiber pigtail assembly 615 which is assembled within first housing 620. This assembly is coupled to first graded refractive index (GRIN) lens 630 which is therefore housed within second housing 625, which is itself assembled within outer housing 670. Also disposed within the outer housing 670 is functional core 635 and third housing 645 within which is second GRIN lens 640. Coupled to the third housing 645 is fourth housing 655 which has assembled within it the second fiber pigtail assembly 650 that houses output fiber 660. Accordingly, the micro-optic coupler rather than seeking to limit/minimize walk off specifically establishes offset interfaces to/from the functional core 635 and provides through angular rotation and lateral movement of the first and fourth housings 620 and 655 respectively correction/adjustment during manufacturing corrections for the walk-off.

In contrast to the prior art second GRIN lens 640 is an asymmetric lens wherein its optical axis of symmetry does not lie along the physical axis of the micro-optic coupler even though the physical axis of second GRIN lens 640 is aligned to the physical axis of the micro-optic coupler. First GRIN lens 630 is accordingly a symmetric GRIN lens. Optionally, the asymmetric lens may be first GRIN lens 630 and symmetric lens the second GRIN lens 640. As depicted each of the first and second GRIN lenses 630 and 640 respectively are flush with the ends of the outer housing 670 whilst each of the first and second fiber pigtail assemblies 615 and 650 respectively are assembled within first and fourth housings 620 and 655 which are flush. It would be evident that the epoxy line may alternatively be defined as an annulus between the piece-parts such that the overall assembly is epoxy free in the optical path. It would be further evident that the first and second GRIN lenses 630 and 640 may be assembled into the outer housing 670 with their respective housings and the functional core 635 and tested as a separate manufacturing process to that of assembling the final micro-optic coupler. Accordingly, this sub-assembly may be assembled in a manner that is hermetic or non-hermetic.

Referring to FIG. 7 there is depicted an asymmetric lens 710 according to an embodiment of the invention wherein it can be seen that the lens exhibits an asymmetric refractive index profile and has a circular cross-section 720. Within the Figures of this specification graded grayscale has been employed to denote refractive index variations and to denote symmetric and asymmetric index profiles. Whilst the lenses are shown with only refractive index variations within their cross-section it would be evident that longitudinal refractive index variations may also be employed in other embodiments of the invention. The exact grayscale does not reflect the exact refractive index distribution but is for indication purposes only. The exact radial, lateral, vertical, horizontal therefore will depend upon a variety of factors including but not limited to, the functional core, the dimensions of the GRIN lens, and desired optical performance. It would be evident that in some embodiments of the invention that one or both of the GRIN lenses within a micro-optic coupler may be formed from one or more birefringent materials such that the refractive index distribution is different from the TE and TM polarizations.

Referring to FIG. 8 there is depicted an asymmetric lens 810 according to an embodiment of the invention wherein the cross-section of the lens presents essentially a circular profile with a flattened portion, which may positioned as depicted in first to third cross-section 820 through 840 respectively in different positions relative to the peak refractive index within the GRIN lens 810.

Now referring to FIG. 9A there is depicted a micro-optic coupler 900 employing an asymmetric lens according to an embodiment of the invention. Micro-optic coupler 900 employs a symmetric GRIN lens and asymmetric GRIN lens such as described above in respect of FIG. 6. Cross-section X-X 910 through the symmetric GRIN lens shows the symmetry of the GRIN lens relative to the external body of the micro-optic coupler, depicted as a single piece for simplicity, which has a square cross-section. Cross-section Y-Y 920 through the asymmetric GRIN lens shows the asymmetry of the GRIN lens relative to the external body of the micro-optic coupler. In this embodiment of the invention each of the symmetric and asymmetric GRIN lenses are similarly depicted as having square cross-section. It would be evident that alternatively the GRIN lenses and internal structure of the micro-optic coupler may be rectangular rather than square and vary from one GRIN lens assembly to the other.

Figure 9B:
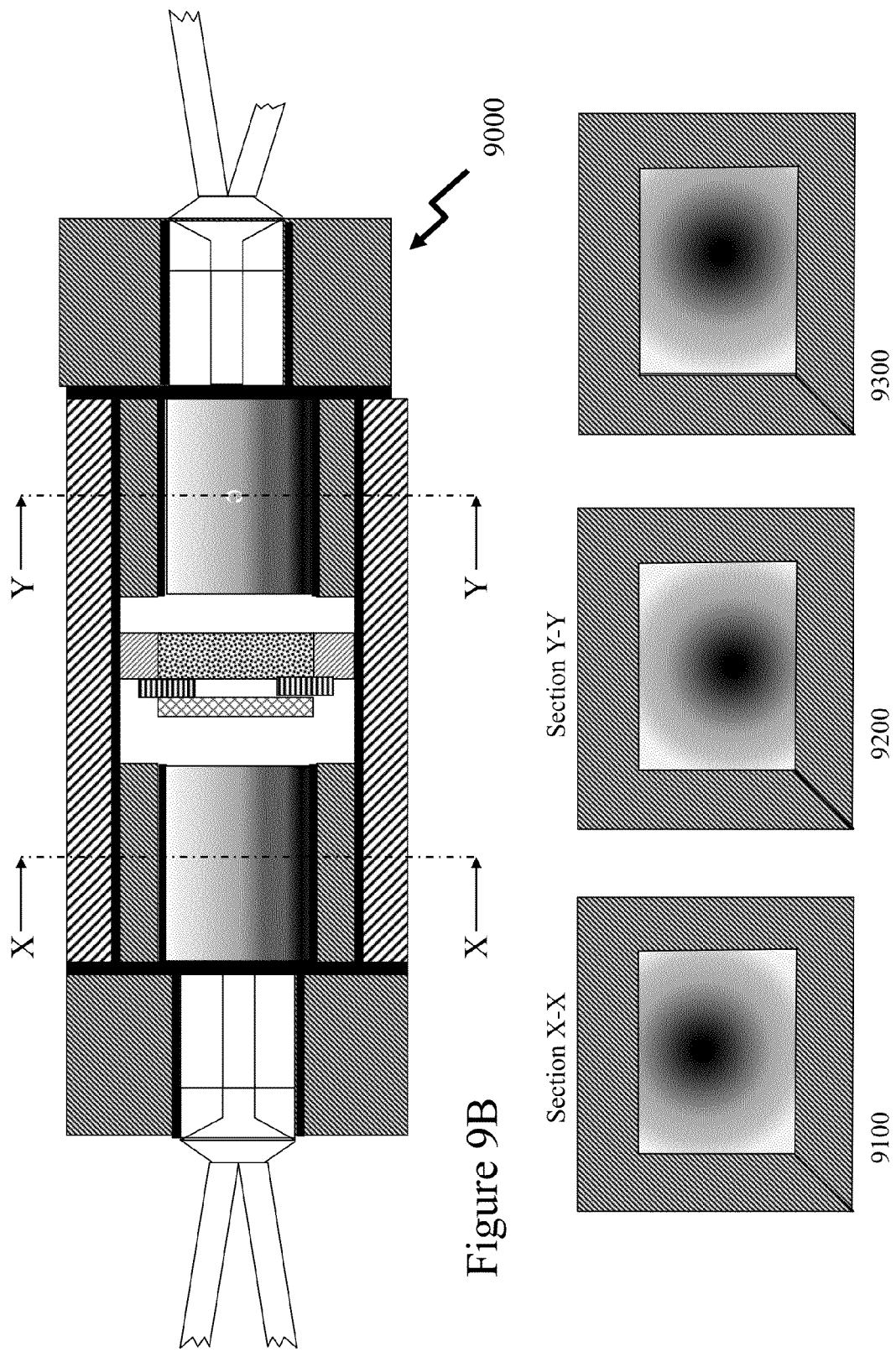
FIG. 9B depicts a micro-optic coupler employing an asymmetric lens according to an embodiment of the invention.

Referring to FIG. 9B there is depicted a micro-optic coupler 9000 employing an asymmetric lens according to an embodiment of the invention. Micro-optic coupler 900 employs two asymmetric GRIN lenses such as described above in respect of FIG. 5. Cross-section X-X 9100 through one asymmetric GRIN lens shows the asymmetry of the GRIN lens relative to the external body of the micro-optic coupler, depicted as a single piece for simplicity, which has a square cross-section. Cross-section Y-Y 9200 through the other asymmetric GRIN lens shows the asymmetry of the GRIN lens relative to the external body of the micro-optic coupler and its inversion relative to that of the other asymmetric GRIN lens. The other cross-section 9300 depicts a variant wherein an asymmetric lens varies in the direction perpendicular to cross-sections X-X 9100 and Y-Y 9200 respectively. In this embodiment of the invention each of the asymmetric GRIN lenses are similarly depicted as having square cross-section. It would be evident that alternatively the GRIN lenses and internal structure of the micro-optic coupler may be rectangular rather than square and vary from one GRIN lens assembly to the other.

Figure 10:
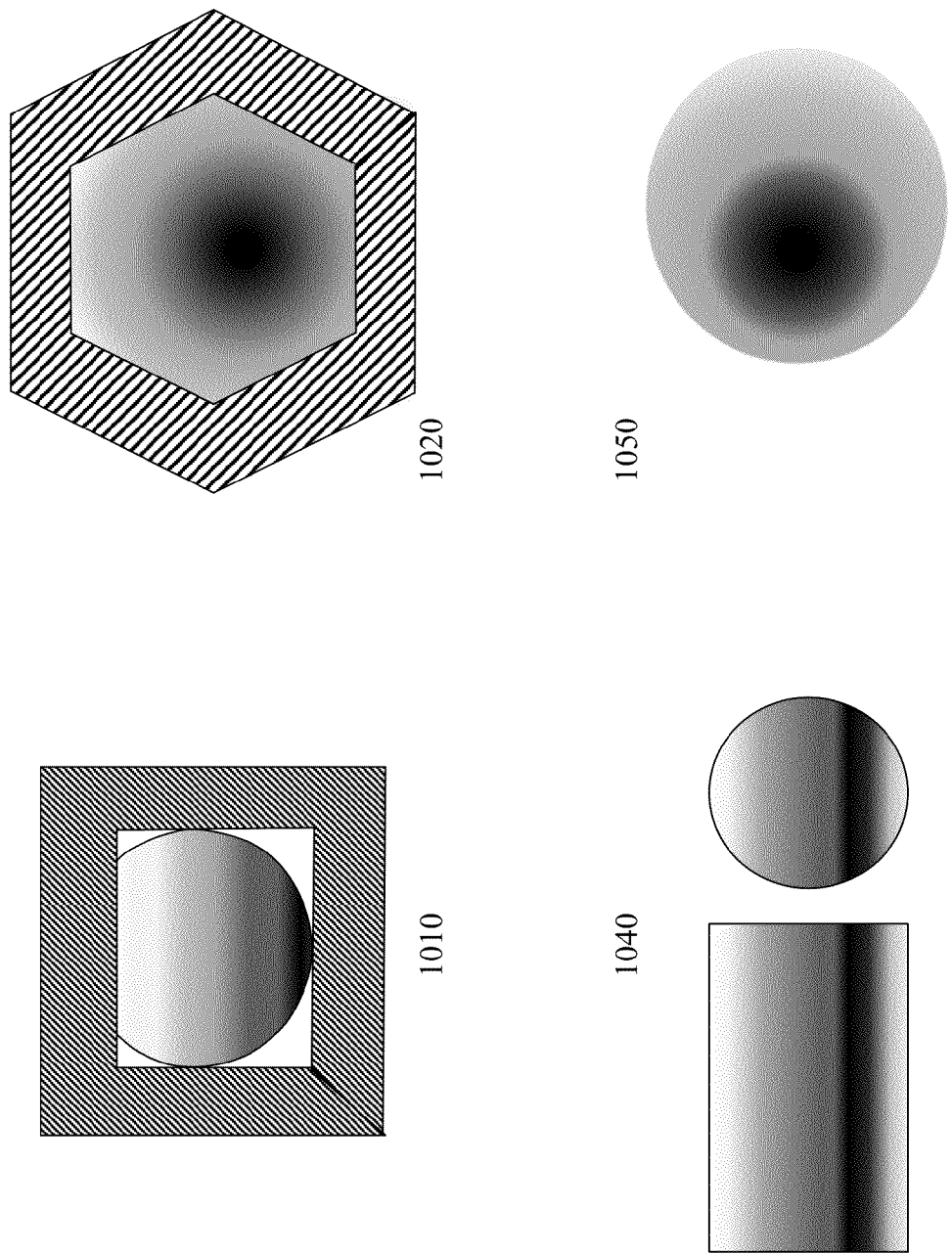
FIG. 10 depicts asymmetric lens assemblies and asymmetric index lenses according to embodiments of the invention.

Now referring to FIG. 10 there are depicted first to fourth cross-sections 1010 to 1040 respectively. First cross-section 1010 shows a rectangular body of the micro-optic coupler, depicted as a single piece for simplicity, with an asymmetric GRIN lens such as depicted in FIG. 8 within. Second cross-section 1020 depicts a hexagonal body of the micro-optic coupler, depicted as a single piece for simplicity, with an asymmetric GRIN lens similarly formed as a hexagonal element within. It would be evident to one skilled in the art that other combinations of lens cross-section and micro-optic piece-part cross-sections may be implemented without departing from the scope of the invention. Third and fourth cross-sections 1030 and 1040 depict GRIN lenses that are circularly symmetric physically but where the grey tones simulated variations in refractive index that are not circularly symmetric with respect to the lens physically.

Figure 11:
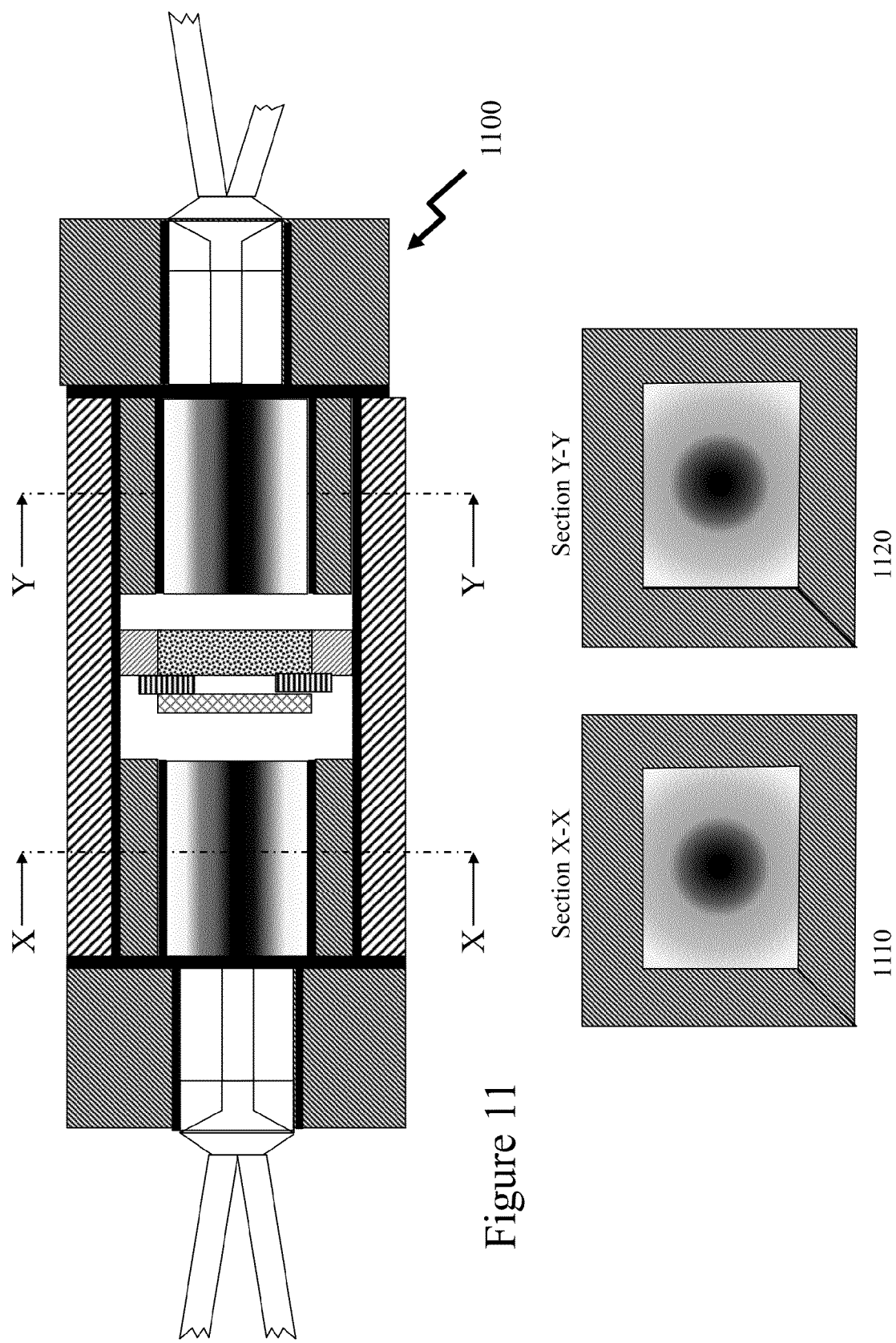
FIG. 11 depicts a micro-optic coupler employing symmetric lenses according to an embodiment of the invention.

Now referring to FIG. 11 there is depicted a micro-optic coupler 1100 employing symmetric lenses according to an embodiment of the invention. Cross-section X-X 1110 through the input symmetric GRIN lens shows the symmetry of the GRIN lens relative to the external body of the micro-optic coupler, depicted as a single piece for simplicity, which has a square cross-section. Cross-section Y-Y 1120 through the second symmetric GRIN lens shows the same symmetry of the GRIN lens relative to the external body of the micro-optic coupler. In this embodiment of the invention each of the symmetric GRIN lenses are similarly depicted as having square cross-section. It would be evident that alternatively the GRIN lenses and internal structure of the micro-optic coupler may be rectangular rather than square and vary from one GRIN lens assembly to the other or having other cross-sections. It would be evident that employing non-circularly symmetric lenses and housing provides alternative structures for assembly and combining multiple micro-optic couplers. Similarly the functional core may also be implemented in a non-circularly symmetric assembly.

Figure 12:
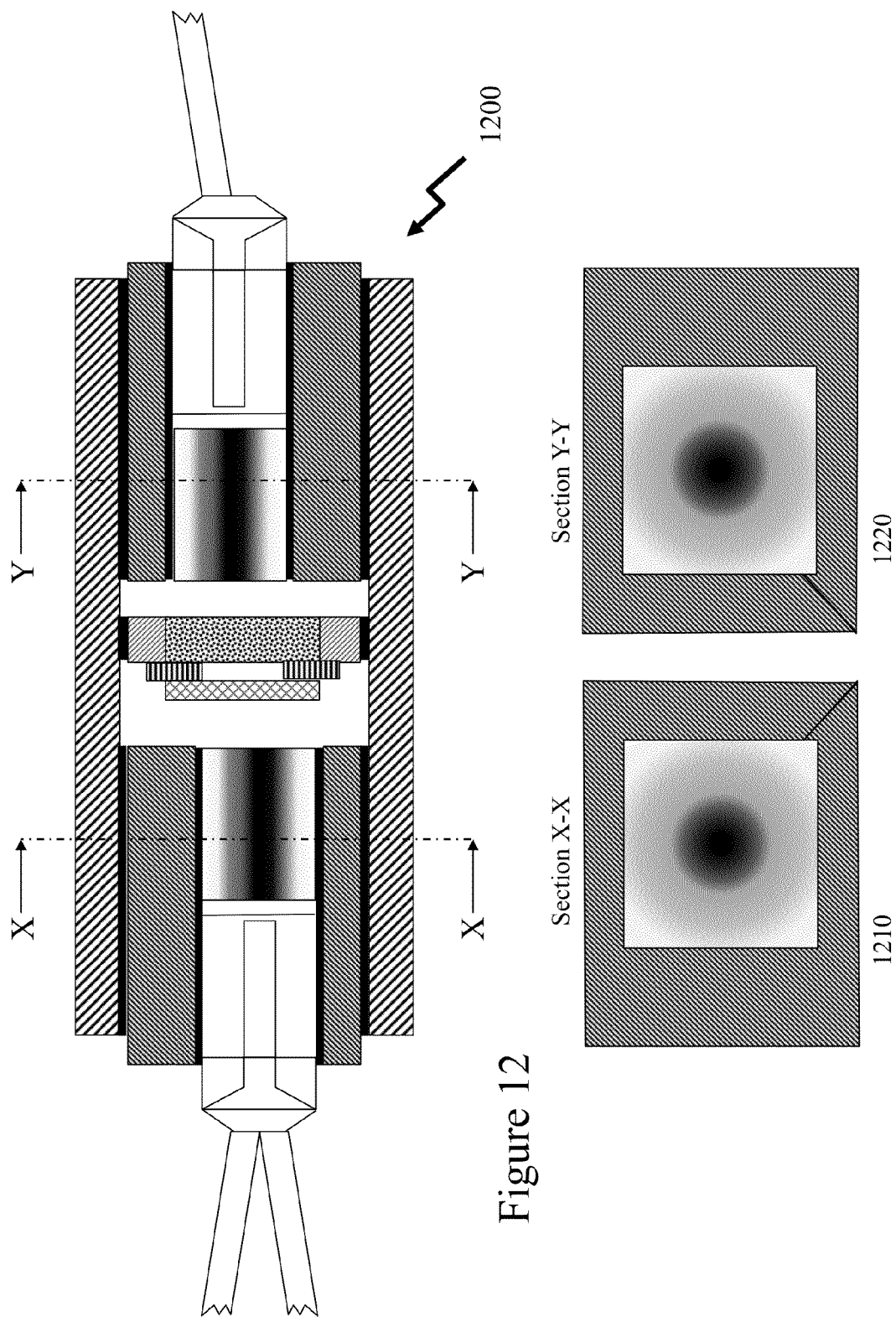
FIG. 12 depicts a micro-optic coupler employing symmetric lenses according to an embodiment of the invention.

Now referring to FIG. 12 there is depicted a micro-optic coupler 1200 employing symmetric lenses according to an embodiment of the invention. Cross-section X-X 1210 through the input symmetric GRIN lens shows the symmetry of the GRIN lens itself with the physical asymmetry relative to the external body of the micro-optic coupler, which is depicted as a single piece for simplicity, which has a rectangular cross-section. Cross-section Y-Y 1220 through the output symmetric GRIN lens shows the symmetry of the GRIN lens itself with the physical asymmetry relative to the external body of the micro-optic coupler.

It would also be evident that the GRIN lens elements may be assembled within a housing of one cross-section that is then assembled within an outer housing with a different cross-section as well as outer housing having similar cross-sections. According to other embodiments of the invention the GRIN lenses and functional cores are mounted directly to the outer housing without intermediate housings or that one or more elements may exploit intermediate housings whilst others do not.

Figure 13:
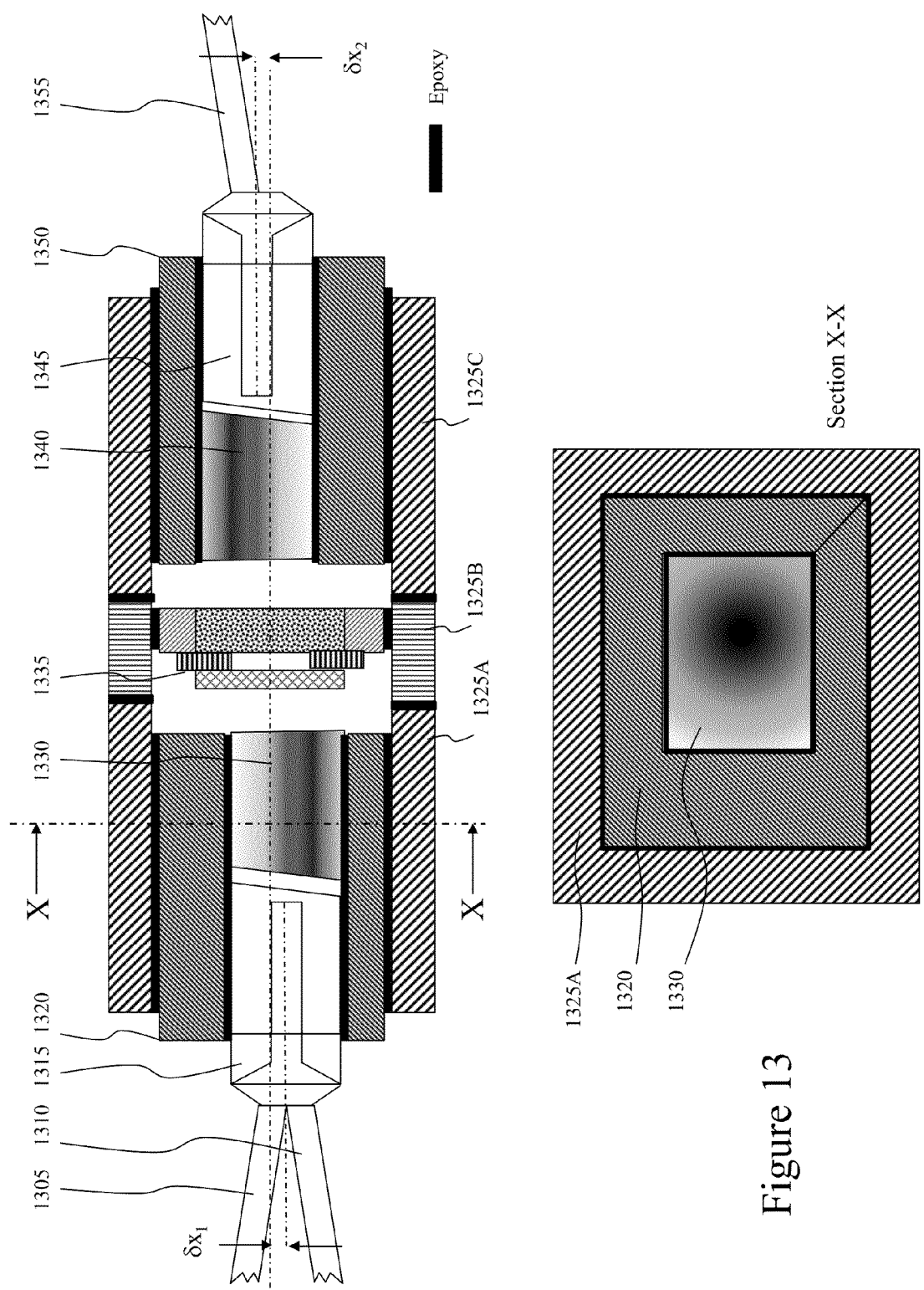
FIG. 13 depicts a micro-optic coupler employing asymmetric lens and mechanical assemblies with multiple sections according to an embodiment of the invention.

Now referring to FIG. 13 there is depicted a micro-optic coupler employing asymmetric lens and mechanical assemblies with multiple sections according to an embodiment of the invention. Accordingly, there is an input fiber 1305 and a first output fiber 1310 which are coupled to a first fiber pigtail assembly 1315 which is assembled within first housing 1320 with first graded refractive index (GRIN) lens 1330. First housing 1320 as depicted has mechanical asymmetry such that the first fiber pigtail assembly 1315 and first graded refractive index (GRIN) lens 1330 are offset by $\delta x_1$ from the axis of second housing 1325A within which first housing 1320 is itself assembled. Disposed within an outer housing 1325B is functional core 1335 which is coupled to the second housing 1325A. Also depicted is third housing 1350 within which is mounted second GRIN lens 1340 along with a second fiber pigtail assembly 1345 that houses output fiber 1355. Similarly to first housing 1320 third housing 1350 has mechanical asymmetry such that the second fiber pigtail assembly 1345 and second graded refractive index (GRIN) lens 1340 are offset by $\delta x_2$ from the axis of fourth housing 1325C within which third housing 1350 is itself assembled. Accordingly, assembly of the micro-optic coupler proceeds with assembly of one of second and fourth housings 1325A and 1325C respectively being coupled to the outer housing 1325B, which has the functional core 1335 assembled within, and then the or other of second and fourth housings 1325A and 1325C respectively is assembled to the outer housing 1325B.

Accordingly, the micro-optic coupler rather than seeking to limit/minimize walk off specifically establishes offset interfaces to/from the functional core 1335 and provides through lateral movement of the second and fourth housings 1320 and 1355 respectively with respect to outer housing 1325B to provide correction/adjustment during manufacturing corrections for the walk-off. In contrast to the prior art first and second GRIN lenses 1330 and 1340 respectively are asymmetric lenses wherein their optical axis of symmetry does not lie along the physical axis of the micro-optic coupler even if the physical axis of the first and second GRIN lenses 1330 and 1340 respectively was aligned to the physical axis of the micro-optic coupler. It would be evident that the epoxy lines are annular between the piece-parts such that the overall assembly is epoxy free in the optical path. It would be further evident that the first and second GRIN lenses 1330 and 1340 may be assembled into the second and fourth housings 1325A and 1325C respectively and functionally tested a part of a separate manufacturing process to that of assembling the final micro-optic coupler. Similarly, the functional core 1335 may be assembled within outer housing 1325B and tested as a separate manufacturing process to that of assembling the final micro-optic coupler. It would be evident that whilst the subassembly and micro-optic coupler depicted are non-hermetic through the use of epoxy that hermetic variants may be established by replacing the epoxy with solder or pseudo-hermetic through the use of very thin long epoxy lines.

Cross-section X-X depicts the cross-section through second housing 1325A through the region comprising first GRIN lens 1330 and first housing 1320 showing the non-circular asymmetric GRIN design together with asymmetric mechanical design of the first housing 1320.

Now referring to FIG. 14 there is depicted a micro-optic coupler employing symmetric and asymmetric lenses with symmetric and asymmetric mechanical assemblies with multiple sections according to an embodiment of the invention. Accordingly, there is an input fiber 1405 and a first output fiber 1410 which are coupled to a first fiber pigtail assembly 1415 which is assembled within first housing 1420. Also depicted is a first graded refractive index (GRIN) lens 1430 which is housed within second housing 1425, which is itself assembled within first outer housing 1470A. Also disposed within the first outer housing 1470A is functional core 1435. As depicted first housing 1420 is coupled to first outer housing 1425, first GRIN lens 1430, and second housing 1425 via an annular epoxy joint. Second housing 1425 is symmetric within this embodiment of the invention.

At the second distal end of the first outer housing 1470A a second outer housing 1470B is attached. Within the second outer housing 1470B a third housing 1445 is mounted that has within it second GRIN lens 1440 and a fourth housing 1465 which has assembled within it the second fiber pigtail assembly 1450 that houses output fiber 1460. Accordingly, the micro-optic coupler rather than seeking to limit/minimize walk off specifically establishes offset interfaces to/from the functional core 1435 and allows lateral movement of the first and second outer housings 1470A and 1470B respectively together with first housing 1420 to provide correction/adjustment during manufacturing corrections for the walk-off. As depicted fourth housing 1465 is asymmetric in contrast to second and third housings 1425 and 1445 respectively which are symmetric. Similarly, in contrast to the prior art first and second GRIN lenses 1430 and 1440 respectively are asymmetric lenses wherein their optical axis of symmetry does not lie along the physical axis of the micro-optic coupler even though the physical axis of the first and second GRIN lenses 1430 and 1440 respectively are aligned to the physical axis of the micro-optic coupler in design case with no manufacturing induced offsets.

Optionally, first and second outer housings 1470A and 1470B respectively together with and fourth housings 1420 and 1465 respectively and functional core 1435 may be dimensioned in conjunction with first and second GRIN lenses 1430 and 1440 respectively to remove the second and fourth housings 1425 and 1465. It would be evident that the epoxy lines are defined as an annulus between the piece-parts such that the overall assembly is epoxy free in the optical path. It would be further evident that the first GRIN lens 1430 and functional core 1435 may be assembled into the first outer housing 1470A tested as a separate manufacturing process to that of assembling the final micro-optic coupler. Similarly, second GRIN lens 1440 and second fiber pigtail assembly 1450 may be assembled and tested whilst first and second outer housings 1470A and 1470B respectively may be joined prior to the alignment of first housing 1420 or vice-versa.

First and second cross-sections X-X and Y-Y depict the symmetric and asymmetric nature of third housing 1445 and fourth housing 1465 respectively with respect to positioning the second GRIN lens 1440 and second fiber pigtail assembly 1450 respectively within second outer housing 1470B. Further, it would be evident that such designs provide for increased ease of exploiting asymmetric GRIN lens designs such as those presented supra in respect of FIGS. 4 through 10 as these are orientated within each subsequent housing by virtue of their cross-section and tolerances.

It would be evident that embodiments the invention may exploit circular GRIN lenses with asymmetric Within some embodiments of the physical axis of the GRIN lenses are aligned to the axis of the functional core and the physical axes of the input and output fiber pigtail assemblies are offset at $\delta x_1$ and $\delta x_2$ respectively to the physical axis of the GRIN lenses are aligned to the axis of the functional core. However, it would be evident that mechanical tolerances, assembly tolerances, lens index distribution variations etc. will induce offsets between the physical axis of the GRIN lenses are aligned to the axis of the physical core which may result in deviations of the optical fiber alignments from the target offsets of $\delta x_1$ and $\delta x_2$.

Within embodiments of the invention described above the functional core may include one or more optical elements including but not limited to, an isolator, a WDM filter, a gain flattening filter, a CWDM filter, a bandpass filter, a power tap, a power splitter, and an attenuator. Within the embodiments of the invention described above the micro-optic coupler has been depicted as having two optical fibers at the input and a single optical fiber at the output. However, it would be evident to one skilled in the art that this nomenclature is essentially arbitrary as the designations of input(s)/output(s) will vary according to the actual function(s) of the functional core. It would also be evident that other fiber counts may be provided without departing from the scope of the invention including for example ⟨ I/P|O/P ⟩ =⟨ 1|1 ⟩ ; ⟨ 1|2 ⟩ ; ⟨ 2|1 ⟩ ; ⟨ 2|2 ⟩ etc.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, etc.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:
1. A method comprising:
providing a housing;
providing a functional core disposed within the housing having a predetermined optical function and an axis with respect to the direction of optical signals coupled to the functional core;
providing a first graded refractive index lens disposed within the housing; the first graded refractive index lens having a first longitudinal axis along the center of its length, a first predetermined refractive index profile perpendicular to the first longitudinal axis and a first non-circular geometry perpendicular to the first longitudinal axis, wherein the first longitudinal axis of the first graded refractive index lens is parallel to but at a first predetermined lateral offset from the axis of the functional core;
providing a second graded refractive index lens disposed within the housing; the first graded refractive index lens having a second longitudinal axis along the center of its length, a second predetermined refractive index profile perpendicular to the second longitudinal axis and a second non-circular geometry perpendicular to the second longitudinal axis, wherein the second longitudinal axis of the second graded refractive index lens is parallel to but at a second predetermined lateral offset from the axis of the functional core; and assembling the first and second graded refractive index lenses within the housing such that they are orientated with respect to each other within the housing to establish a predetermined optical path for an optical signal coupled from an input of the first graded refractive index lens via and functional core to an output of the second graded refractive index lens.

2. The method according to claim 1, wherein
the first predetermined refractive index profile is radially symmetric relative to the first longitudinal axis of the first graded refractive index lens; and
the second predetermined refractive index profile is radially at least one of symmetric and asymmetric relative to the second longitudinal axis of the second graded refractive index lens.

3. A method according to claim 1, wherein
providing the housing comprises providing a tube having predetermined internal geometry;
providing the functional core comprises assembling at least one optical element to a mount having an exterior profile corresponding to predetermined internal geometry of the housing;
providing each of the first and second graded refractive index lenses comprises providing each with a lens holder, each lens holder having an external geometry corresponding to the predetermined internal geometry of the housing.

4. A device comprising:
a housing;
a functional core disposed within the housing having a predetermined optical function and an axis with respect to the direction of optical signals coupled to the functional core;
a first graded refractive index lens disposed within the housing; the first graded refractive index lens having a first longitudinal axis along the center of its length, a first predetermined refractive index profile perpendicular to the first longitudinal axis and a first non-circular geometry perpendicular to the first longitudinal axis, wherein the first longitudinal axis of the first graded refractive index lens is parallel to but at a first predetermined lateral offset from the axis of the functional core;
a second graded refractive index lens disposed within the housing; the first graded refractive index lens having a second longitudinal axis along the center of its length, a second predetermined refractive index profile perpendicular to the second longitudinal axis and a second non-circular geometry perpendicular to the second longitudinal axis, wherein the second longitudinal axis of the second graded refractive index lens is parallel to but at a second predetermined lateral offset from the axis of the functional core; and
the first and second graded refractive index lenses within the housing such that they are orientated with respect to each other within the housing to establish a predetermined optical path for an optical signal coupled from an input of the first graded refractive index lens via and functional core to an output of the second graded refractive index lens.

5. The device according to claim 4, wherein
the first predetermined refractive index profile is radially symmetric relative to the first longitudinal axis of the first graded refractive index lens; and
the second predetermined refractive index profile is radially at least one of symmetric and asymmetric relative to the second longitudinal axis of the second graded refractive index lens.

6. A device comprising:
a housing;
a functional core disposed within the housing having a predetermined optical function and an axis with respect to the direction of optical signals coupled to the functional core;
a first optical sub-assembly comprising:
    a first graded refractive index lens with a first longitudinal axis along the center of its length, a first predetermined refractive index profile perpendicular to the first longitudinal axis and a first non-circular geometry perpendicular to the first longitudinal axis, wherein the first longitudinal axis of the first graded refractive index lens is parallel to but at a first predetermined lateral offset from the axis of the functional core;
    a first optical fiber assembly comprises a first optical fiber and a first optical fiber holder;
a second optical sub-assembly comprising:
    a second graded refractive index lens with a second longitudinal axis along the center of its length, a second predetermined refractive index profile perpendicular to the second longitudinal axis and a second non-circular geometry perpendicular to the second longitudinal axis, wherein the second longitudinal axis of the second graded refractive index lens is parallel to but at a second predetermined lateral offset from the axis of the functional core;
    a second optical fiber assembly comprises a second optical fiber and a second optical fiber holder.

7. The device according to claim 6, wherein
the first predetermined refractive index profile is radially symmetric relative to the first longitudinal axis of the first graded refractive index lens; and
the second predetermined refractive index profile is radially at least one of symmetric and asymmetric relative to the second longitudinal axis of the second graded refractive index lens.

8. The device according to claim 6, wherein
at least one of the first and second graded refractive index lens has a planar portion forming a predetermined portion of the respective at least one of the first and second outer profile.

9. The device according to claim 6, wherein
at least one of the first optical fiber assembly and the second optical fiber assembly comprises a third optical fiber.

* * * * *